W. B. Hatch,
Sawing Stone.
Nº 14,656.    Patented Apr. 15, 1856.
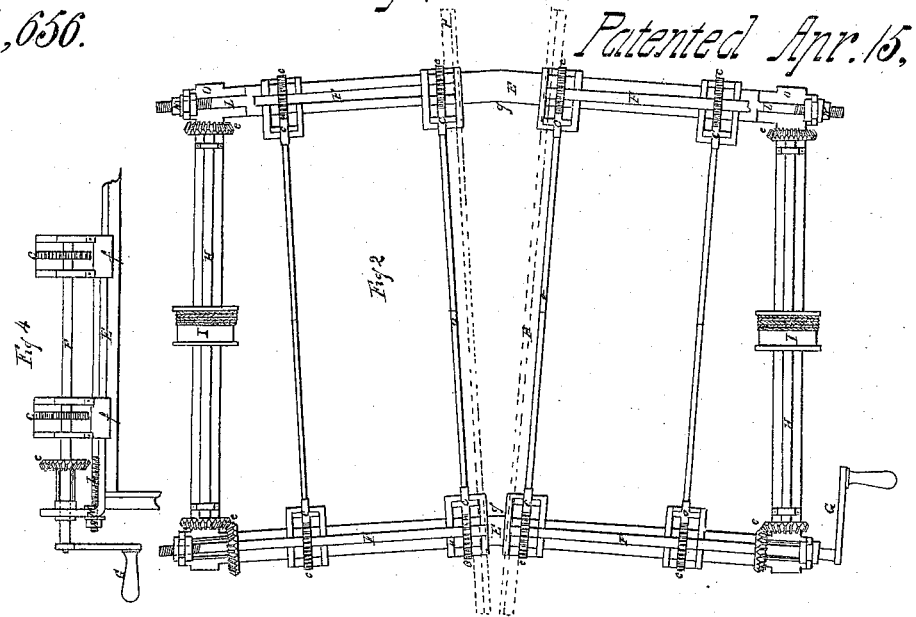
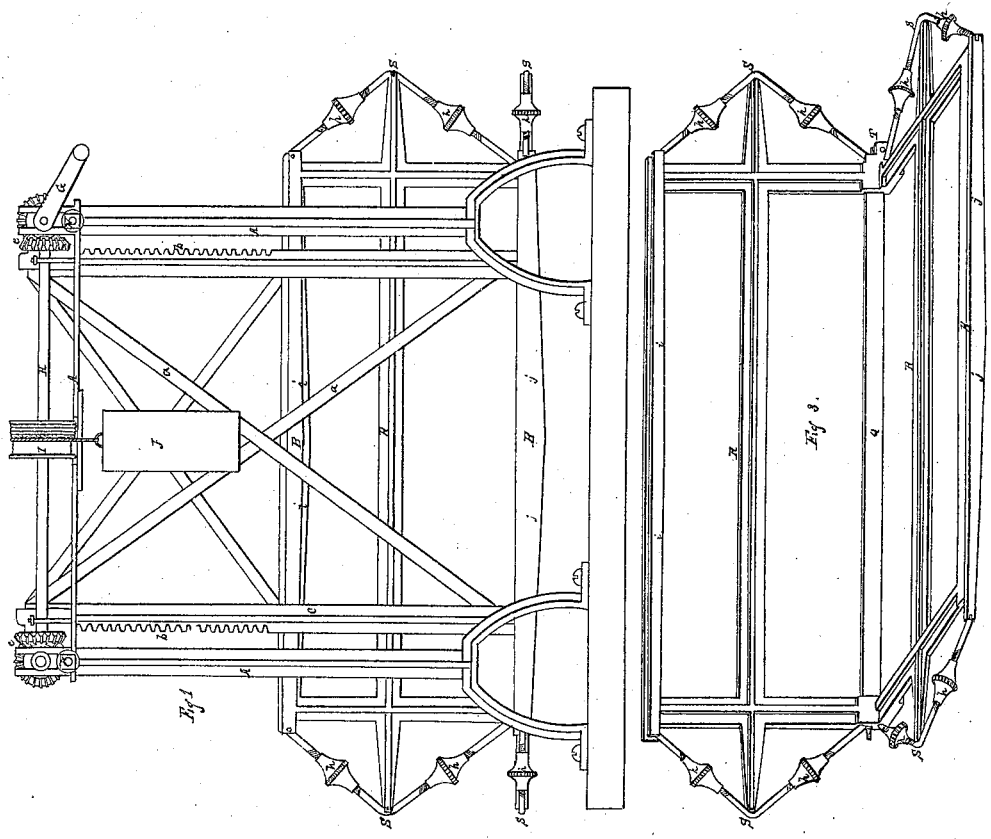

UNITED STATES PATENT OFFICE.

WILLIAM B. HATCH, OF ELMIRA, NEW YORK.

STRAINING MARBLE-SAWS.

Specification of Letters Patent No. 14,656, dated April 15, 1856.

*To all whom it may concern:*

Be it known that I WILLIAM B. HATCH, of Elmira, in the county of Chemung and State of New York, have invented a new and useful Improvement in Machinery for Sawing Marble; and I do hereby declare that the following is a full, clear, and exact description of the construction and operation of the same, reference being had to the accompanying drawings, making a part of this specification, in which—

Figure 1 is a longitudinal elevation, Fig. 2, a plan view, and Fig. 3, a perspective of the saw frame.

The same letters refer to like parts.

In Fig. 1, A represents the standards and top beam of the frame of the machine; B, one of the saw frames; C, one of the adjustable guide frames, two of which suspend each saw; *a a* are cross pieces for strengthening the guide frames; *b b* are rack-teeth which mesh with small pinions on two parallel shafts placed directly over the beveled top beam, E E, Fig. 2, in which are shown the parallel shafts F F and *c c* the pinions upon them. By turning the crank G, the saws are raised or lowered as may be required. The shafts F F are connected by the cross shaft H, and beveled gears *e e* so that the whole move simultaneously, thus keeping the saws always level. A drum pulley I, is placed on the shaft, on which a weight is suspended J Fig. 1, to balance the saw frame. The pinions are placed in pairs upon a movable carriage K, which slides on the top frame E E, shown in elevation at Fig. 3.

E is the way upon which the carriage K rides, secured by flanges at *f f*.

L is a screw passing from the carriage through a part of the frame at M, where it receives the nut N, by means of which the carriage may be drawn to or from the supposed center of the block of marble to be sawed at *g g*, in order to vary the angle of the two saws. There being one of these carriage at each corner of the machine the angle may be readily adjusted as desired by simply turning the nuts N. The beveled pinion and part of the shaft are removed at O Fig. 2, to show a plan view of this arrangement. The top frame or ways are inclined from the center, *g* in order to make their direction approximate to a right angle to the line of the saws, the position of which is shown by the dotted lines P P.

The saw frames, Fig. L, is of rectangular form, the saw Q, being strained by nut and screw directly in the angles of the two equal parallelograms, which compose it, one of which is vertical, the other horizontal. A strong longitudinal bar R passes through the center of each part, projecting a little beyond the frame at each end. Over the ends of these center bars a strong iron band S, is drawn, and corresponding ones are attached at the central and outer angles of the frame. These rods are united by a nut working on right and left hand screws *h h* on the ends of the bands, by tightening which the bands are drawn over the center bar to any degree of tension desired. Two of these compound strap and screw braces are attached to each end of the frame, making, in connection with the other parts a combination frame of unequaled strength of construction. The power is attached by a pitman at T so that the strain is exerted directly at the saw. Those parts of the frame marked *i i* and *j j* move on the bearings of the guide frames.

This construction of frame supplies the desideratum for perfectly straining the saws, hitherto so difficult of attainment in machines for sawing tapering blocks, while the method of hanging and guiding the saws obviates the great amount of friction consequent upon the workings of cams, slides, screw-feeds, &c., and is simple in construction, easily managed and not liable to get out of repairs. What I claim as my invention and for which I desire to secure Letters Patent is—

The rectangular saw-frame constructed with center-bars and tension-braces, for straining the saws, in the manner and for the purposes set forth.

WILLIAM B. HATCH.

Witnesses:
EDW. V. COULTON,
O. H. FRASEE.